July 6, 1943.  J. A. MEISTER  2,323,722
TROLLEY CONVEYER
Filed June 5, 1941  2 Sheets-Sheet 1
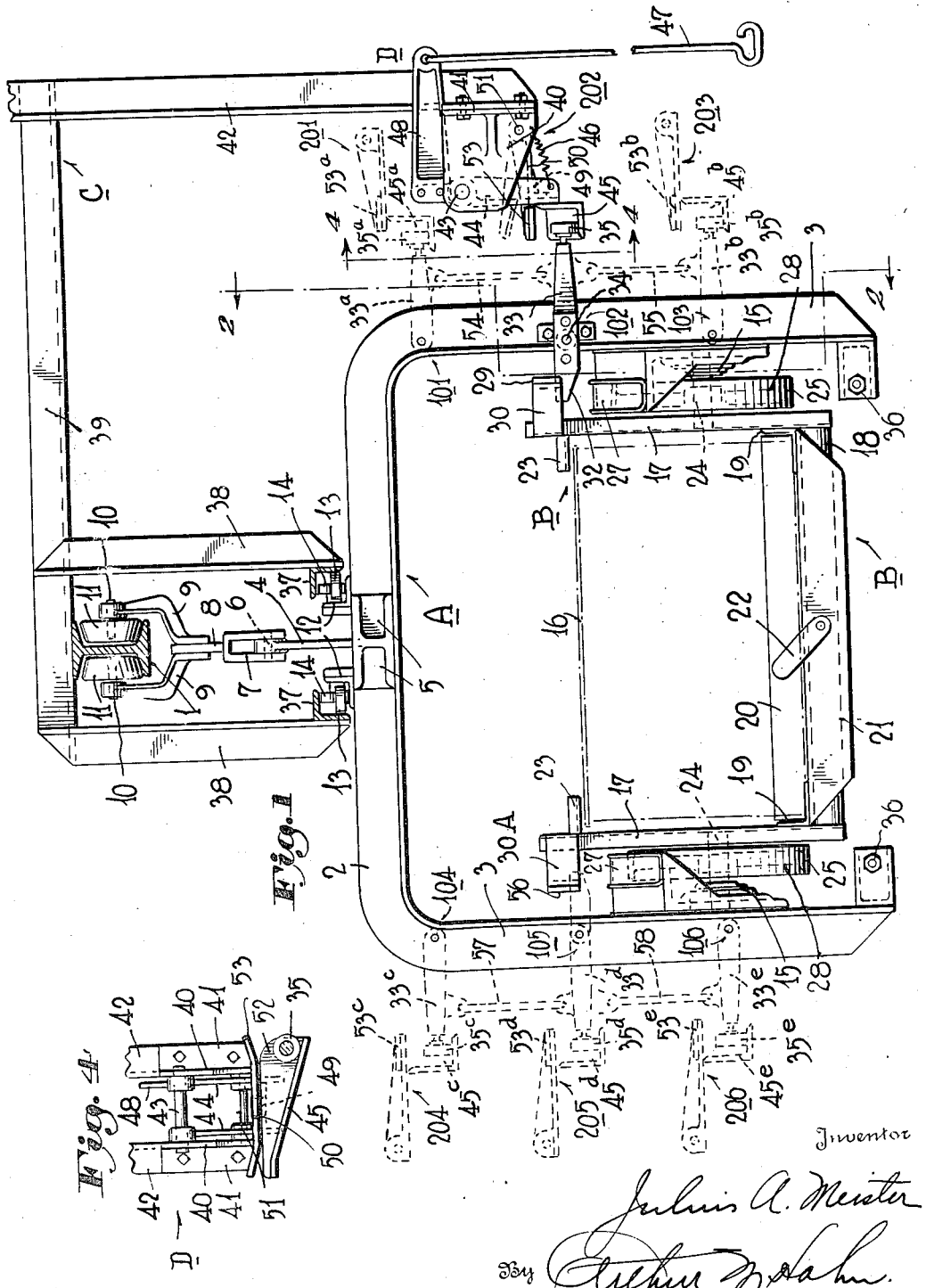

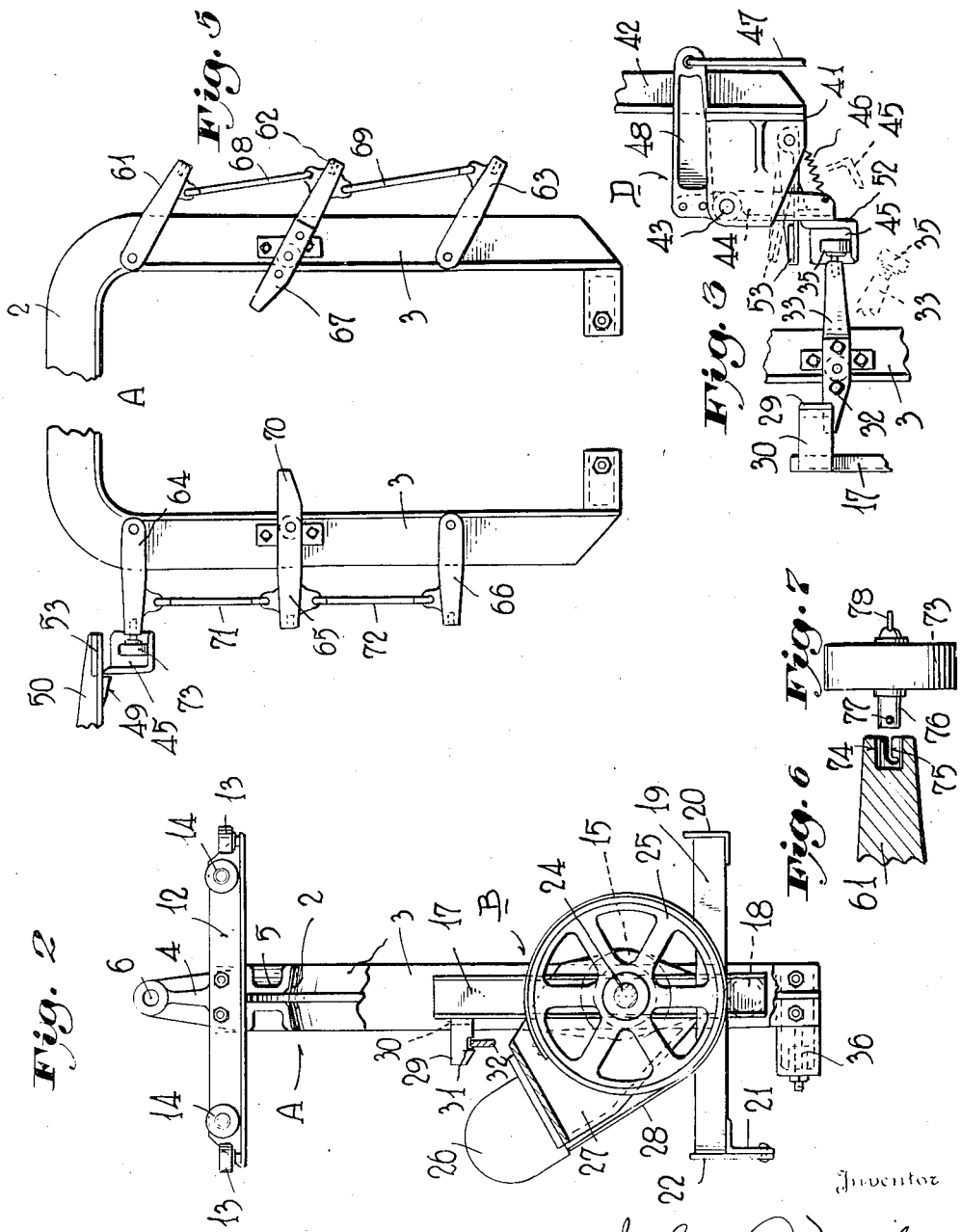

Patented July 6, 1943

2,323,722

UNITED STATES PATENT OFFICE 2,323,722

TROLLEY CONVEYER

Julius A. Meister, Ellwood City, Pa., assignor to Mathews Conveyer Company, Ellwood City, Pa., a corporation of Pennsylvania Application June 5, 1941, Serial No. 396,776

4 Claims. (Cl. 214—60)

This invention relates to conveyers and more particularly to trolley conveyer systems that are adapted to distribute material from a loading station to one of any number of work stations where it is discharged. The present invention is in the nature of an improvement over the conveyer system described and illustrated in my copending application Serial No. 348,562, now Patent No. 2,273,583, issued February 17, 1942.

The particular embodiment of the invention shown in the accompanying drawings is a conveyer system primarily intended for use in carrying and distributing tobacco from a storage room to a number of machines used in the manufacture of cigars, cigarettes, etc. Conveyer systems of this character usually have an endless track along which any number of carriers loaded with material are moved from a loading station in the storage room, past the various machines and finally returned to the loading station, the material being discharged at a work station adjacent one of the machines.

Previously, the conveyer systems used for this purpose either had a mechanism on the carrier for selectively dispatching the material to a particular station, or had a mechanism controlled by the operator at a work station for effecting discharge of the load when additional material was required at the station. In the selective dispatch type of system, the material was discharged at the selected station whether that station needed additional material or not. The type of system in which the work station operator effected discharge of the load could only accommodate one type or class of material and therefore, machines using different materials would have to be serviced by separate conveyer systems. My afore-mentioned pending application contains a more complete and detailed description of each of these types of conveyer systems.

The primary object of the present invention is to provide a conveyer system in which mechanism controlled by an operator at a work station automatically effects the discharge of material at the station and which can accommodate a variety of different types of materials for use at different stations.

Another object of the invention is to provide a conveyer system with means for dispatching material to selected stations and with means controlled by operators at those stations for automatically effecting discharge of the material.

A further object of the invention is to provide a conveyer system for selectively dispatching different materials to certain stations with mechanism at the stations for effecting discharge of the material which are automatically moved to inoperative position after the load is discharged.

With these and other objects in view, the invention may be said to consist in the various combinations and novel arrangements of parts used in the assembly of a conveyer system such as that hereinafter described.

In the drawings accompanying and forming a part of this specification, wherein like numerals designate like parts throughout the several views;

Figure 1 is a rear elevation of a carrier in the system showing the carrier approaching a work station;

Figure 2 is a vertical sectional view taken on the line 2—2 of Figure 1;

Figure 3 is a fragmentary rear elevation showing the details of the station tripping mechanism and the latch tripping member on the carrier;

Figure 4 is a vertical sectional view taken on the line 4—4 of Figure 1;

Figure 5 is a fragmentary rear elevation of a carrier showing a modified form of the invention;

Figure 6 is an enlarged horizontal sectional view of a tripping member used in this modification; and Figure 7 is an enlarged elevation of a detachable roller used in the modified form of the invention.

Although the conveyer shown in the drawings is particularly adapted for use in carrying and distributing tobacco, it is obvious that the invention may be used in conveyer systems for other materials without departing from the scope of the invention.

In the particular conveyer system illustrated, provision is made for handling six different classes of material. The conveyer comprises an endless overhead track 1, having a cross-section similar to the well-known I beam, which is usually suspended from the ceiling. The invention contemplates the use of any number of carriages similar to the one designated in the drawings by the letter A which are suspended from and moved along the endless track 1.

Each carriage A has a frame formed of an inverted U-shaped member having a top portion 2 extending transversely of the track 1, and depending supports 3—3 on opposite ends of the top portion 2. A plate 4 is secured to brackets 5 which are mounted on the top 2 of the frame. A pin 6 is journalled in the plate 4 to pivotally support the frame between bifurcated ends 7—7 on the lower end portion of a suspension member 8. Secured to the upper end portion of the suspension member 8 are a pair of arms 9—9, carrying axles 10—10 which hold wheels 11—11 in position to roll along the track 1. A power driven chain (not shown) may be connected to the suspension member 8 in any suitable manner to pull the carriage A along the track 1.

A pair of longitudinally disposed angle irons 12—12 are secured to brackets 5 in transversely spaced relation to carry four horizontal guide wheels 13—13, and four vertical guide wheels 14—14 to steady the carriage when it passes a work station, as will subsequently appear.

The supports 3, have bearings 15—15 mounted on the inside of the frame of the carriage A to rotatably support a load carrying tray B which is adapted to carry a skip or tote box indicated at 16 filled with material. This tray consists of channel side pieces 17—17 arranged in transversely spaced relation and connected by a rod 18 secured to the lower end portions of the side pieces 17. The rod 18 supports a rectangularly shaped frame composed of angle iron side pieces 19—19 which are connected by a front angle iron 20 and a rear angle iron 21. The rear angle iron 21 has its vertical flange disposed downwardly so a skip 16 may be easily slid onto horizontal flanges of the angle irons 19, 20 and 21 where it is carried. The skip is prevented from sliding off of the tray by a turn button 22 that is pivotally mounted on the vertical flange of the rear angle iron 21. A pair of arms 23 are carried on the inside of the upper end portions of the side pieces 17 to prevent the skip from falling off of the tray when it is inverted to discharge a load.

A pair of stub shafts 24—24 are rigidly mounted on the side pieces 17 and are fitted in bearings 15 so the tray B may be rotated with respect to the carriage A to discharge a load. Each of the stub shafts 24 has a wheel 25 keyed thereto. A pair of spring balances 26 are supported by brackets 27 which are secured to each of the supports 3 on the frame of the carriage A. Straps 28 are fastened to each of the wheels 25 and extend around a portion of the periphery of the wheels. Each of these straps 28 is also connected to one of the spring balances 26 so the tension of the springs tends to rotate the wheels 25 to invert the tray B.

The tray B is normally held in upright load carrying position by a latch plate 29 that is carried by a bracket 30 which is secured to one side channel 17. The latch plate 29 has a notch 31 formed in its lower side to engage an arm 32 that is mounted on a tripping member 33. The tripping member 33 is pivotally mounted on the support 3 of the carriage by a pin 34 that passes through the support and the tripping member. A roller 35 is rotatably mounted on the outer end of the tripping member 33 to engage a tripping mechanism at a work station as will more fully hereinafter appear.

It will be apparent from the foregoing description that by moving the roller 35 upwardly, the arm 32 will become disengaged from the notch 31 in the latch plate 29 thereby releasing the tray B which will be inverted by the action of springs 26. The rotation of the tray B is limited to approximately 180° by spring stops 36—36, that are mounted on the lower end portions of each of the supports 3, which engage bracket 30 and a similar bracket 30A, secured to the opposite side piece 17 when the tray is inverted. With the tray in this position, the roller 35 will, due to its own weight, move downwardly to an inoperative position as indicated by broken lines in Figure 3.

A plurality of work stations such as the one designated C in Figure 1, are located along the path of the conveyer. These work stations have machines that use material discharged by the skips 16 on the carriages A as they more along the track 1. Each work station C has a pair of longitudinally extending angle iron guide rails 37—37 supported in transversely spaced relation by brackets 38—38 suspended from a beam 39 that supports the station C. Guide wheels 13 and 14 on the carriage A engage the vertical and horizontal flanges, respectively, of the guide rails 37 to steady the carriage and prevent it from swinging on the pivot 6.

Each work station C has a tripping mechanism generally designated by the letter D that is adapted to release the latch on a carriage to cause the load to discharge from the skip 16. The tripping mechanism D consists of a pair of supporting plates 40—40 that have flanges 41, by means of which the mechanism is mounted on angle iron supports 42. A shaft 43 is journalled in the plates 40 and carries a pair of arms 44—44. These arms have an upwardly inclined cam rail 45 attached to their lower end portions. The cam rail 45 is adapted to engage the roller 35 on a carriage A as it passes the work station C to cause the load to discharge. A tension spring 46 which is connected between the cam rail 45 and one of the supporting plates 40, tends to pull the cam rail away from the path of the roller 35 to an inoperative position, as shown in dotted lines in Figure 3. In order to move the cam rail into the path of the roller to an operative position (full line position in Figure 3), an operating handle 47 is pivotally connected to a lever 48 that is secured to one of the arms 44 so a downward movement of the operating lever will cause the cam rail to move its operative position.

A latch 49 is attached to a bar 50 that is pivotally mounted between the supporting plates 40 by a shaft 51. The latch 49 engages a vertical flange 52 on the cam rail 45 to hold it in operative position. A latch rail 53 is mounted on one end portion of the bar 50 so it will overlie the cam rail when the latter is held in operative position by the latch 49. When the roller 35 on the carriage moves up the cam rail, it engages the latch rail 53 and moves it upwardly thereby causing the latch 49 to release the cam rail 45 so it will be pulled to its inoperative position by the spring 46.

In operation, loaded skips are placed on the carriages at a loading station and the tray is held in upright position by the engagement of the latch arm 32 with the notch 31 in latch plate 29. When the loaded carriage is moved along the track 1, the roller 35 will not be actuated at work stations when the cam rail is in inoperative position. As the carriage passes a work station where the operator has set the cam rail in operative position, the roller 35 will be moved upwardly by the cam rail, thereby causing the tripping member 33 to be released from the latch plate 29. The tray B will then be automatically inverted by the springs 26 and the load will be discharged. As the roller 35 continues to move up the cam rail 45, it will engage and raise the latch rail 53 which will cause the latch 49 to release the cam rail whereupon it will be moved to its inoperative position by the spring 46.

The empty carriage then continues along the track eventually returning to the loading station. Since the tripping member 33 is in inoperative position, the roller 35 will not engage the tripping mechanism at other work stations. The cam rail at the station where the load was discharged will remain in inoperative position and hence will not engage the rollers on the other loaded carriages to cause their loads to be discharged. When more material is required, the operator moves the cam rail to operative position by pulling the operating handle 47.

The general construction and operation of the conveyer system thus far described is similar to that described in my aforementioned pending application, but such a system will only accommodate one type of material at a time. The present invention contemplates the use of any number of different materials without sacrificing any of the advantages of the former conveyer system. In the specific embodiment of this invention illustrated in the drawings, provision is made for accommodating six different types or classes of material.

The supports 3 on the carriage, each have three holes drilled therein to provide six different positions on the carriage in which the tripping member 33 may be mounted. For convenience these six locations, as shown in broken lines in Figure 1, have been designated 101, 102, 103, 104, 105 and 106. The tripping member 33 described above and shown in solid lines in Figure 1 is located at position 102. Positions 101 and 103 are on the same support 3, but are located above and below position 102, respectively. Positions 104, 105 and 106 are vertically spaced on the opposite support 3 and correspond to positions 101, 102 and 103, respectively.

If the carriage has a tripping member 33a located at position 101, a link 54 is connected between the tripping members 33 and 33a and a roller 35a is mounted on tripping member 33a instead of the roller 35 on member 33. When the roller 35a is moved upwardly, link 54 moves member 33 upwardly so the arm 32 is released from latch plate 29. Similarly, a member 33b at position 103 has a link connecting it with the member 33 and has a roller 35b instead of the roller 35.

When the tripping member is located in positions 104, 105 or 106 on the opposite side of the carriage, the tripping member 33 and arm 32 are removed. A similar member 33d and arm 32d are secured to the opposite support 3. Also, a latch plate 56, similar to latch plate 29 is mounted on the bracket 39A. If a tripping member 33c is located at position 104, it is connected to member 33d by a link 57. A similar link 58 is used to connect the tripping member 33d to a member 33e at position 106.

Each carriage A in the system is marked to indicate the class of material that it is intended to carry, depending upon the position at which the tripping member is mounted on the particular carriage. For example, if the six classes of material are designated F, G, H, K, L and M, carriages with tripping members in position 101 are marked F and those with members in positions 102, 103, 104, 105 and 106, are marked G, H, K, L and M, respectively.

The various work stations in the system have their tripping mechanisms arranged to correspond to the positions of the tripping members on the carriages. For example, a station using material F has its tripping mechanism in position 201 to correspond to position 101 on the carriage. Stations using materials G, H, K, L or M have their tripping member correspondingly located in positions 202, 203, 204, 205 or 206, respectively. Any number of carriages for carrying the different types of material may be provided depending upon the requirements of the work stations. Also, the conveyer system may service any number of work stations using the different types of material.

In the operation of the conveyer system, the skips 16, loaded with material, are placed on the trays B of the carriages A as they pass the loading station. As a carriage marked F (with a tripping member in position 101) passes the loading station, a skip containing material F is placed on the tray B. The tray is held in upright position by the engagement of arm 32 in latch plate 29 and the tripping member 33a with roller 35a is thereby held in operative position. The carriage then continues along the track until it comes to a work station that uses material F (with the tripping mechanism in position 201) and at which the operator has set cam rail 45a in operative position by pulling the operating handle on the tripping mechanism. As the carriage passes this station, the roller 35a is engaged by cam rail 45a and moved upwardly. This causes tripping member 33a, link 54 and tripping member 33 all to move upwardly thereby disengaging arm 32 from the latch plate 29 and permitting the tray B to be inverted by springs 26 to discharge the material. The tripping member 33a then moves to its inoperative position and the empty carriage continues along the track, without engaging other tripping mechanisms, until it reaches the loading station where it is again loaded with material.

A carriage loaded with material F will not discharge the material at a station using some other type of material because the tripping member in position 101 will only engage tripping mechanisms in position 201 regardless of whether the cam rails at other stations are set in operative or inoperative positions. Carriages for other types of material will likewise only be unloaded at a station using that particular material and which also has its cam rail set in operative position.

If a work station uses more than one type of material, it may be provided with a tripping mechanism for each type that is used. When the station is in need of certain types of materials, the operator may set the cam rails on the tripping mechanisms corresponding to the types required in operative position, and the next carriages loaded with those types will discharge their loads as they pass the station.

While I have described and illustrated a conveyer for six different types of material, it is obvious that the invention contemplates a conveyer system for any number of different types.

In Figures 5 to 7, inclusive, I have shown a modified form of my invention. The general structure of the track, carriages, trays, and station tripping mechanisms is substantially the same as that already described. The main difference in this modification is that tripping members are mounted in all six positions on each of the carriages instead of only in one position on each carriage. As may be readily seen in Figure 5, the carriage A has six tripping members 61, 62, 63, 64, 65 and 66. Three of these members are arranged in vertically spaced relation on each of the supports 3. The tripping member 62 has an arm 67 attached thereto which is adapted to engage the latch plate 29 on the tray B (Figure 2). The tripping members 61 and 63 above and below the member 62 are connected thereto by links 68 and 69, respectively. On the opposite support 3, the member 65 has an arm 70 adapted to engage the latch plate 66 on the tray B (Figure 1) and is connected to members 64 and 66 by links 71 and 72, respectively.

The outer ends of the tripping members are identical so a description of one will suffice for all. Each member is adapted to hold a detachable roller 73 in a hole 74 drilled into its end portion. The inner surface of this hole 74 is formed with two oppositely disposed bayonet slots 75, one of which is clearly shown in Figure 6. The roller 73 is rotatably mounted on a stub shaft 76 (Figure 7) that has pins 77 projecting from its surface and arranged to slide into slots 75. The outer end portion 78 of the shaft 76 is flattened to form a grip so the shaft may be easily turned to lock the pins 77 in the slots 75 and thus securely hold the roller 73 on the tripping member.

In the operation of this modification of my invention, a skip loaded with material is placed on the tray B as the carriage A passes the loading station. The operator at the loading station then inserts the shaft 76 of the roller 73 into the end of the tripping member that is used for the particular material and turns the grip 78 to lock the pins 77 in the bayonet slots 75. It will be apparent that the skip may contain any of the six types of material used in the system. By changing the detachable roller from one tripping member to another, it is possible to pre-select the stations at which the load will be discharged.

The unloading operation is substantially the same as that which has been previously described. The load is discharged at the first station that has its tripping mechanism supported in a position corresponding to the position of the tripping member in which the roller is placed, and that also has its cam rail in operative position.

When the detachable roller 73 is inserted in one of the tripping members, the carriage must be locked in upright position by the latch arm on the same side of the carriage as the roller and the other latch arm must be in inoperative position. As shown in Figure 5, the roller 73 is carried by the tripping member 64 which is in operative position, and the latch arm 70 is in position to engage the latch plate on the tray. The tripping members 61, 62 and 63 on the other side of the carriage are in inoperative position and the latch arm 67 is disengaged from the latch plate on the tray.

If desired, this modification of the invention may be used in a system having each work station equipped with tripping mechanisms arranged to correspond to all six of the tripping members on the carriage. It will be apparent that the conveyer system would then have means for selectively dispatching each carriage from the loading station, depending upon the type of material being loaded, and also selective means at the work station for discharging the load depending upon the type of material required. In addition, the selective means on the carriage and also the tripping mechanism at the work station move to an inoperative position when the load is discharged.

While I have illustrated and described a conveyer system for handling six types of material, it is obvious that any number of different types could be accommodated without departing from the scope of the invention.

What I claim is:

1. In a trolley conveyer system, a plurality of carriages for transporting material from a loading station to a plurality of discharging stations, a latch on each carriage for controlling the discharge of material therefrom, a member on each carriage selectively positionable at certain elevations thereon for determining a station at which the material on the carriage will be discharged, a pivotal link adapted to connect the latch to said member in its selected position, a tripping mechanism at each of said stations movable into and out of operative position, said tripping mechanisms being arranged at preselected elevations each to engage a member at that elevation to cause a selected carriage to discharge the material therefrom, means on each carriage tending to move said member to inoperative position after it has engaged a tripping mechanism, and a latch for holding said member in operative position.

2. In a trolley conveyer system, a plurality of carriages for transporting material from a loading station to a plurality of discharging stations, a latch on each carriage for controlling the discharge of material therefrom, a plurality of members on each carriage positioned at different elevations thereon, a connection between each member and said latch, a contacting element detachably connectible to each of said members and adapted to be carried by one of said members to determine a particular station at which material on the carriage will be discharged, a tripping mechanism at each of said stations movable into and out of operative position, said tripping mechanisms being arranged at preselected elevations each to engage a contacting element at that elevation to cause a selected carriage to discharge material therefrom, means on each carriage tending to move said contacting element to inoperative position after it has engaged a tripping mechanism, and a latch for holding said contacting element in operative position.

3. In a trolley conveyer system, a plurality of carriages for transporting material from a loading station to a plurality of discharging stations, a latch on each carriage for controlling the discharge of material therefrom, a plurality of pivotally mounted arms on each carriage positioned at different elevations thereon, a connection between each arm and said latch, a roller detachably connectible to each of said arms and adapted to be carried by one of said arms to determine a particular station at which material on the carriage will be discharged, a tripping mechanism at each of said stations movable into and out of operative position, said tripping mechanisms being arranged at preselected elevations each to engage a roller at that elevation to cause a selected carriage to discharge material therefrom, means on each carriage tending to move said roller to inoperative position after it has engaged a tripping mechanism, and a latch for holding said roller in operative position.

4. A trolley conveyer system adapted to carry material from a loading station to a plurality of working stations and including a track extending from said loading station to said working stations, carriages movable along said track to transport material from said loading station to said working stations, said carriages having means for discharging material, a latch preventing the discharge of said material, members positioned at different elevations on said carriage and each operatively connected to said latch for releasing the same, a detachable element adapted to be carried by a selected one of said members to determine the particular station at which material on the carriage will be discharged, means operable upon discharge of the material from the carriage to move said element to inoperative position, and a tripping mechanism movable to and from operative position, supported at each of said working stations and adapted to engage said element when in operative position to cause the material to be discharged, the tripping mechanisms at certain of said stations being supported at positions different from the mechanisms at other stations and corresponding to the position of said element on one of said tripping members.

JULIUS A. MEISTER.